3,140,382
METHOD OF JOINING COMPONENT PARTS OF ENVELOPES FOR HIGH-POWER TRANSISTORS

Henricus Emanuel Dijkmeijer, Mollenhutseweg, Nijmegen, Netherlands, assignor to North American Philips Company, Inc., New York, N.Y., a corporation of Delaware
No Drawing. Filed Aug. 31, 1962, Ser. No. 220,900
Claims priority, application Netherlands Sept. 19, 1961
3 Claims. (Cl. 219—92)

This invention relates to a method of joining in a gas or vacuum-tight manner component parts of an envelope for high-power semi-conductor devices.

In such high-power semi-conductor devices, such as transistors or crystal diodes, a satisfactory dissipation of the developed heat during operation is of extreme importance. The semi-conductor element is therefore mounted, by means of a low-melting point solder, on a copper bottom, a so-called "base," of comparatively large dimensions. Then, a metal bulb, for example of iron, must be joined in a gas-tight manner on the circumference of the base.

It has appeared that brazing is not suitable for joining the component parts. The result of brazing would be that owing to the comparatively high temperature required for brazing, the semi-conductor crystal would be damaged by diffusion of the solder mass, with which the element is joined to the base, into the semi-conductor element. By soldering by means of low-melting alloys, no permanent gas or vacuum-tight joint can be obtained. Also welding of the component parts as such was not a good solution. It was not possible to obtain a joint which is mechanically sufficiently rigid and also gas-tight. The difficulty in welding these component parts of the envelope together appeared to be caused by the high heat conductivity of copper. As a result of this, the temperature at the welding point remains too low when welding, while the temperature of the bulb becomes much too high. In case of an iron bulb, the temperature thereof becomes so high that the iron burns.

It is known to join metal components by depositing on the component parts a phosphorus-containing nickel layer from an electroless nickel-plating bath or electrolytically, then bringing the component parts into the position in which they are to be joined and then heating the assembly for from 5 minutes to two hours or longer at a temperature between 800 and 1400° C. in a protective atmosphere until substantially all the phosphorus has disappeared.

This known method is not suitable for joining component parts of an envelope of high-efficiency transistors, the base plate of which consists of copper and the bulb of a different metal, for example nickel, iron or steel. With this method the transistor would be damaged inter alia by diffusion of phosphorus into the semi-conductor element. In addition, a phosphorus-containing nickel layer alone is not suitable because it does not provide sufficient protection against corrosion. When joining the components, such a layer is apt to flow away locally from the component parts, because this layer flows into the welding seam by capillary action, as a result of which the metal of the component parts themselves is not longer covered.

According to the invention, the component parts are covered with a layer of nickel of at least 4 microns and at most approximately 10 microns thick and, insofar as the copper component parts are concerned, they are then heated at a temperature between 500 and 900° C. for such a long period of time that the nickel is diffused superficially into the copper, after which the component parts thus treated are covered with a phosphorus-containing nickel layer from an electroless nickel-plating bath and are then joined by the local supply of heat. This may be effected, for example, by resistance welding.

For a nickel layer of 4 microns thick, heating at a temperature of from 800 to 830° C. for 30 minutes is sufficient.

Essential for the method according to the invention is the said thermal treatment. By this treatment the nickel diffuses into the copper, as a result of which a nickel-copper alloy is formed in the surface layer. This alloy has a high electric resistance and a low heat conductivity and as a result of this very favourable conditions exist for joining the component parts of the envelope by means of the low-melting phosphorus-containing nickel layer without damaging the semi-conductor element and without decreasing the satisfactory heat dissipation of such a high-efficiency semi-conductor device during operation.

A small quantity of welding energy is sufficient to effect the joining. The welding energy may be supplied locally for a very short period of time in the order of magnitude of 1 millisecond.

The nickel layer with which the component parts are first of all covered according to the invention and which is caused to diffuse into the copper by heating is preferably applied by electro-deposition. In a layer provided from a chemical nickel-plating bath the electric and thermal conductivities of the copper are influenced somewhat unfavourably during diffusion. The nickel layer may also be provided in the form of a paste.

What is claimed is:

1. A method of joining metal bodies at least one of which is constituted of copper comprising the steps of covering a portion of the surface of the body constituted of copper with a nickel layer having thickness between about 4 and 10 microns, heating the nickel coated copper body to a temperature between 500° C. and 900° C. for a sufficient time for the nickel to diffuse superficially into the copper, covering the so-treated copper body with a phosphorus-containing nickel layer, and joining the so covered body to another metal body by locally heating the bodies while in contact with each other.

2. A method as claimed in claim 1, in which the local supply of heat is effected by resistance welding.

3. A method as claimed in claim 1, in which the nickel layer is applied by electrodeposition.

References Cited in the file of this patent
UNITED STATES PATENTS

| | | |
|---|---|---|
| 2,151,758 | Gier | Mar. 28, 1939 |
| 2,200,742 | Hardy | May 14, 1940 |
| 2,223,312 | Briggs | Nov. 26, 1940 |
| 2,819,381 | Lindow et al. | Jan. 7, 1958 |